(12) United States Patent
Yalamanchi

(10) Patent No.: US 8,204,865 B2
(45) Date of Patent: Jun. 19, 2012

(54) LOGICAL CONFLICT DETECTION

(75) Inventor: Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 170 days.

(21) Appl. No.: 12/547,570

(22) Filed: Aug. 26, 2009

(65) Prior Publication Data

US 2011/0055169 A1    Mar. 3, 2011

(51) Int. Cl.
*G06F 17/30* (2006.01)

(52) U.S. Cl. .................................. 707/690; 707/703

(58) Field of Classification Search .............. 707/695, 707/702, 703, 708; 710/244
See application file for complete search history.

(56) References Cited

U.S. PATENT DOCUMENTS

| | | | | |
|---|---|---|---|---|
| 5,263,155 A * | 11/1993 | Wang | ............................. | 707/695 |
| 5,263,156 A * | 11/1993 | Bowen et al. | .................. | 707/609 |
| 6,272,515 B1 * | 8/2001 | Fouquet | ......................... | 718/101 |
| 6,631,386 B1 | 10/2003 | Arun et al. | | |
| 7,631,132 B1 * | 12/2009 | Neuman | ........................ | 710/244 |
| 7,899,997 B2 * | 3/2011 | Michael | ......................... | 711/150 |
| 7,925,637 B2 * | 4/2011 | Ma et al. | ......................... | 707/690 |
| 2006/0227776 A1 * | 10/2006 | Chandrasekaran | ............ | 370/389 |
| 2007/0097992 A1 * | 5/2007 | Singh et al. | ................ | 370/395.54 |
| 2007/0294321 A1 * | 12/2007 | Midgley et al. | ................ | 707/204 |
| 2008/0127035 A1 * | 5/2008 | Lev et al. | ........................ | 717/100 |
| 2009/0144706 A1 * | 6/2009 | Pastorelli | ........................ | 717/128 |
| 2009/0235254 A1 * | 9/2009 | Michael | .......................... | 718/101 |
| 2009/0307277 A1 * | 12/2009 | Grubov et al. | ................. | 707/655 |
| 2010/0293338 A1 * | 11/2010 | Krishnaprasad et al. | ...... | 711/136 |
| 2010/0332538 A1 * | 12/2010 | Gray et al. | ..................... | 707/774 |
| 2011/0055169 A1 * | 3/2011 | Yalamanchi | ................... | 707/690 |
| 2011/0088130 P1 * | 4/2011 | Carruth et al. | | |

OTHER PUBLICATIONS

Microsoft Technet, SQL Server 2008 Books, Online: Conflict Detection in Peer-to-Peer Replication, pp. 1-3, found online on Jul. 31, 2009 at: http://technet.microsoft.com/en-us/library/bb934199(printer).aspx.

* cited by examiner

*Primary Examiner* — Shahid Alam
*Assistant Examiner* — Mohammad Kabir
(74) *Attorney, Agent, or Firm* — Kraguljac Law Group, LLC (57) ABSTRACT

Systems, methods, and other embodiments associated with detecting and avoiding logical conflicts between long duration transactions are described. One example method includes generating conflict keys for long transactions using conflict queries that operate on data being manipulated to return a conflict key to be associated with the transaction. The conflict keys may be used to detect or avoid logical conflicts that occur in long duration transactions running concurrently.

21 Claims, 5 Drawing Sheets

LOGICAL CONFLICT DETECTION

BACKGROUND

Long duration transactions are transactions that keep their data modifications atomic and isolated from concurrent transactions for relatively longer periods of time. Long duration transactions are utilized in some workspace management systems that allow users to perform "off line" manipulation of data. In such systems, workspaces are used to model the long transaction semantics and multiple copies of data modified through data manipulations in a workspace environment are created to maintain a transaction-private version of the data that is reconciled with the live data version when the transaction (workspace) is completed.

The database management systems that support long transactions using version control define the unit of versioning as a row identified by a primary key and the same is used to determine conflicts among concurrent transactions. That is, when a long transaction modifies a column value, a private copy of the corresponding row, with the updated column value, is created for the transaction. The versioned row is used in the place of its ancestors (determined by the matching primary key) for all subsequent queries within the transaction. Concurrent transactions modifying the data in a same single row conflict with each other and these conflicts are reconciled before the transactions are merged/committed. Often the conflict detection is automated so that a transaction involved in a conflict is prevented from committing. Pessimistic locking mechanism may be used to prevent conflicts from happening. Existing implementations of version control systems detect physical conflicts between transactions by relying on the primary keys of modified rows in a relational database to flag conflicting data modification operations. For instance, if one transaction modifies a column value in a row with a specific primary key and another transaction modifies (any column in) the same row, these two transactions are determined to conflict on the row.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In the following description, references to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL, SPARQL), an OQL, a natural language, and so on.

"Software", as used herein, includes but is not limited to, one or more executable instructions stored on a computer-readable medium that when executed cause a computer, processor, or other electronic device to perform functions, actions and/or behave in a desired manner. "Software" does not refer to a program listing per se. The stored instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Conflict detection based on at least physical boundaries of a row may not detect or prevent logical conflicts that exist between concurrent transactions. The logical conflicts that should be detected or prevented for a given application vary based on business requirements and may not be detected by physical boundary based detection methods. For example, a logical conflict may exist between two transactions, one of which assigns a new employee to a department and the other reduces the budget for the same department. Depending on the physical structure of the database, these two transactions may not operate on the same physical row and as such may not be flagged as conflicting under traditional detection methods.

A version control system used to support the notion of long transactions in a database management system maintains transaction-specific copies of data modified within a transaction. The unit of versioning determines the extent of data copied for each data modification operation. In a relational data model the unit of versioning is a row and multiple copies of the same row bear the same primary key value. In the existing systems, the unit of versioning also determines the unit of conflict detection in that modifications to the same "row" by concurrent transactions are flagged as conflicts. The row-based conflict detection in existing implementations are tightly bound to the relational data model and these techniques cannot be extended to alternate data models, such as RDF, where the notion of a row does not exist.

When the relational data model is mapped to RDF, the data stored in a specific relational table represent triples describing instances of a specific RDF Class. In this representation, the columns in the relational table map to RDF Properties that are used to describe a resource and each primary key value from the relational table maps to a resource (subject in the triple) that is described using these properties. A single row from the relational data model maps to a set of triples (typically one for each non-key column) that have the common subject.

Triple 1: <http://www.myorg.com/contract/projectHLS> pred:ownedBy <http://www.myorg.com/department/Dept1>
    Triple 2: <http://www.myorg.com/contract/projectHLS> pred:hasValue "100000"^xsd:integer In a relational data model the data modification operations operate on rows. Whereas in an RDF data model, the individual triples (which map to a cell in a relational table row) are the target of the data modification operations. So, the RDF data model lends itself to a finer grained unit of versioning than its relational counterparts. However, the triples do not have separate primary keys that would facilitate maintaining multiple versions of a single triple. For example, the particular Subject, Predicate, Object combination in a triple constitutes its key and any modification to the triple contents creates a new key. So, although the unit of versioning is a triple, the same cannot be used to detect conflicts and thus there is no notion of physical conflicts in the RDF data model.

The relational data model implicitly enforces a cardinality constraint for the table columns by ensuring that a column can only hold one value. For example, if ownedBy is a column in a relational table, it may only hold one value (this is true for multi-valued columns in which case the set of values is still considered atomic). However, an RDF data model does not impose such constraints unless they are explicitly declared. So, from the previous example, a single subject may participate in two triples with the ownedBy property. This further complicates the conflict detection while working with the RDF data model, as two transactions asserting the same property with the same subject (but different object values) may not conflict with each other.

Figure 1:
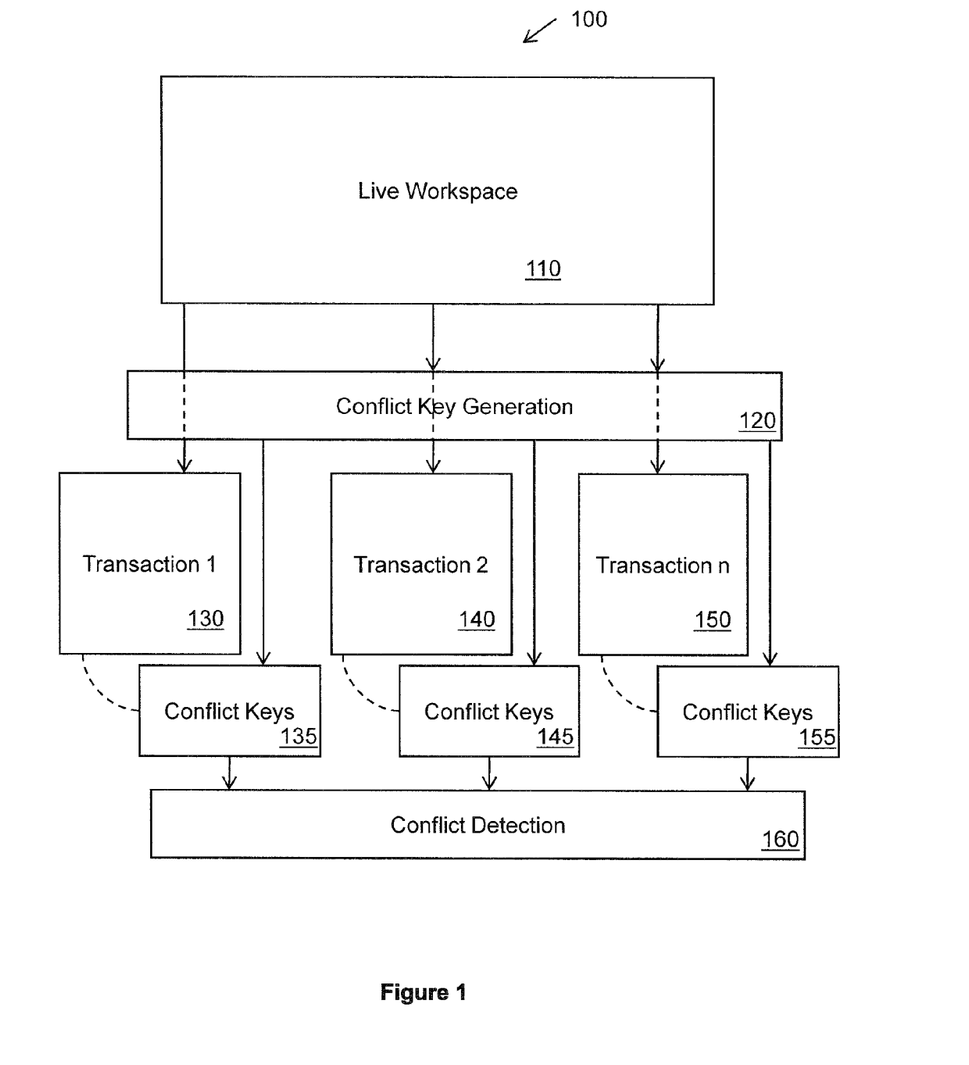
FIG. 1 illustrates one embodiment of a system associated with logical conflict detection.

FIG. 1 is one embodiment of a functional block diagram of an example embodiment of a long transaction processing system 100. A live workspace 110 includes data that is capable of being accessed and manipulated by short transactions. The live workspace may include relational data that is stored in tables or RDF data stored as triples. One or more long duration transactions 130, 140, 150 are also acting upon the data in the live workspace 110. These long transactions are creating modified copies of data from the live workspace that may conflict with a version of the same data from another long transaction. A conflict key generation logic 120 generates one or more conflict keys 135, 145, 155 for each data manipulation operation performed by one of the long transactions 130, 140, 150.

Each of the collected conflict keys 135, 145, 155 is associated with the long transaction and data manipulation operation that generated it. Depending on the type of conflict resolution method, i.e., optimistic or pessimistic, being used by the long transaction processing system 100, the conflict keys 135, 145, 155 may be accumulated during the long transaction for later action by a conflict detection system 160 or communicated to the conflict detection system as they are generated. The conflict detection system 160 identifies two data manipulation operations having the same conflict key as conflicting.

The conflict keys 135, 145, 155 generated by the conflict key generation logic 120 represent dynamic units of conflict detection, which could vary for each data manipulation operation. In the traditional version control system for the relational data model, a conflict key for any given data modification operation is the same as the primary key of the row being modified. So, two concurrent transactions modifying two columns in the same row generate the same primary key value as the conflict keys and thus have to be reconciled before merging the corresponding transactions. In contrast, the conflict key generation logic 120 determines the conflict keys based on the nature of the data manipulation operation and can thus be used to define complex and dynamic units of conflict detection that meet specific business requirements. For the purposes of this description, an RDF data model will be used, however, the same conflict key generation logic 120 can be adapted to work with relational as well as RDF data models.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
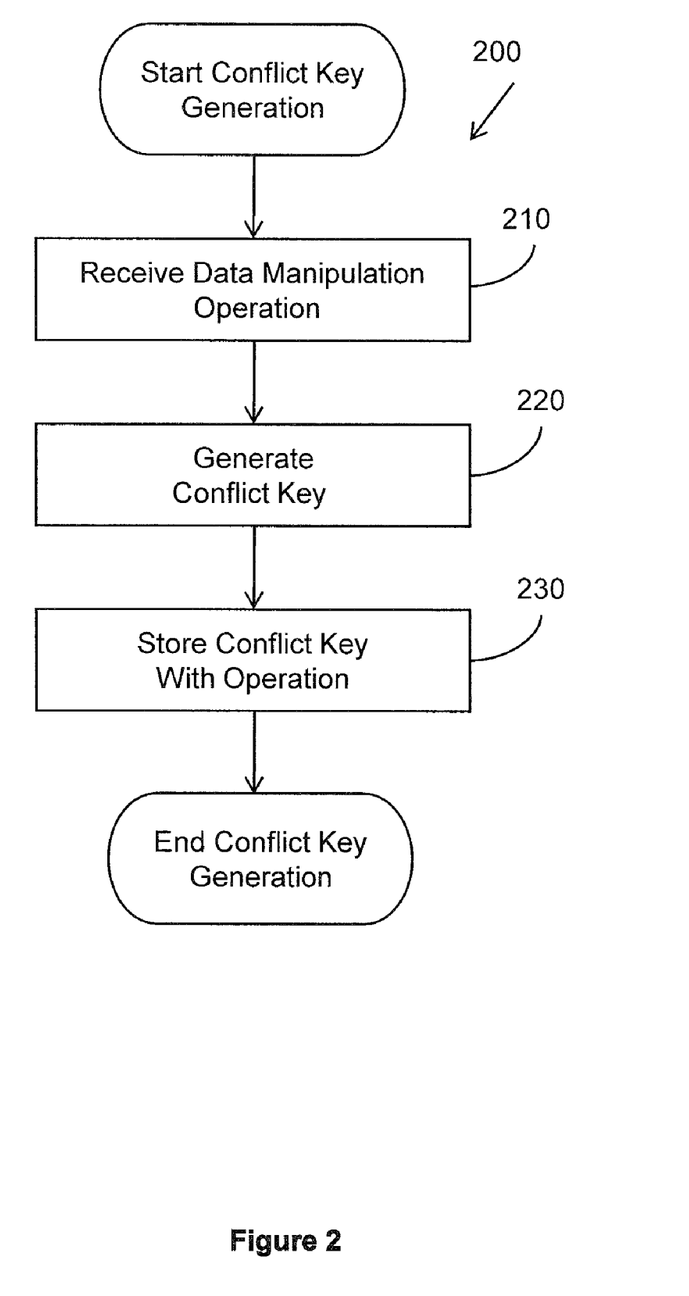
FIG. 2 illustrates one embodiment of a method associated with logical conflict detection.

FIG. 2 is one embodiment of a flow diagram illustrating an example embodiment of a method 200 that may be employed by the conflict key generation logic 120 (FIG. 1) to generate conflict keys. At 210 a data manipulation operation being performed by a long transaction is received. At 220, a conflict key is generated for the data manipulation operation. The conflict key may be generated according to a set of business requirements. For example, a conflict detection rule may stipulate that no two transactions can manipulate information pertaining to employees reporting to the same manager or that data pertaining to a contract's value cannot be manipulated by more than one transaction. The conflict keys may be generated by selecting one or more resources from an RDF triple being modified by the data manipulation operation. At 230, the conflict keys are stored in a manner that associates it with the data manipulation operation. The conflict keys maybe recorded in a metadata table along with the identifier for the modified triple and the transaction that modified it. A transaction generating the same conflict key for multiple data manipulation operations may be collapsed into one record.

Figure 3:
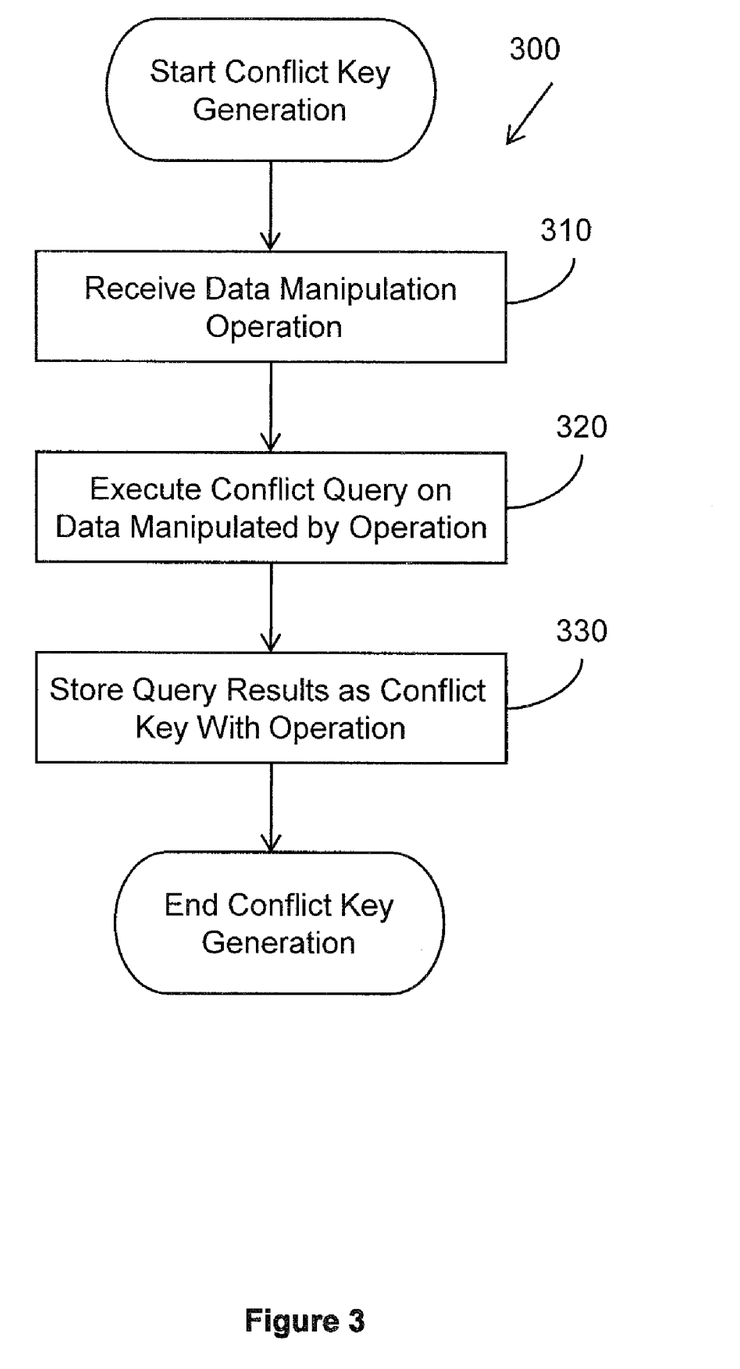
FIG. 3 illustrates another embodiment of a method associated with logical conflict detection.

FIG. 3 is one embodiment of a flow diagram outlining an example embodiment of a method 300 of generating a conflict key for a data manipulation operation. In the method 300, a conflict query is used to generate a conflict key for the data manipulation operation. At 310, a data manipulation operation is received from a long transaction. The data manipulation operations on RDF data stored as triples are characterized as INSERTs and DELETEs. Since triple components (subject, property, object) together constitute the key for the triple, updating a triple is equivalent to deleting the old key and inserting a new key. Each triple subject to a data manipulation operation matches a graph pattern {?sub ?prop ?obj}, where variable sub matches the subject of the modified triple, prop matches the property and obj matches its object value. A conflict key for a data modification operation is a resource that can be related to either of these variables using a graph query language.

At 320, the conflict query is executed on the data manipulated by the operation. For example, the conflict query is executed by least a processor of a computing device. The conflict query may select a subject, property, or object of a data triple to be modified by the data manipulation operation as the conflict key. For example, the following conflict query selects the subject of the modified triple as the conflict key for transaction modifying the triple. When the relational data is mapped to RDF data, the following conflict query is also the one that returns the primary key of the modified row and hence mimics the (physical) conflict detection supported in current implementations.

ON INSERT or DELETE OF { ?sub ?prop ?obj }
SELECT ?conflictKey
WHERE { ?conflictKey orardf:let ?sub }

The previous example uses a special orardf:let directive (in SPARQL format) to assign the value to a variable, conflict-Key. The SELECT clause in the conflict query returns one or more values to be used as the conflict keys for the transaction modifying the triples.

The conflict query may specify a selection criteria involving the resources of a data triple to be modified by the data manipulation operation such that the conflict query does not return a result when the selection criteria on the resources of the data triple is not met. The ability to define arbitrary conflict queries allows complex business requirements to be captured as declarative statements. For example, if an RDF graph represents the employee hierarchy in an organization, a conflict detection rule may stipulate that no two transactions can manipulate information pertaining to employees reporting to the same manager. In this case, the conflict key for a modified triple is the resource that holds hasManager relationship with the subject of the modified triple.

ON INSERT or DELETE OF { ?sub ?prop ?obj }
SELECT ?conflictKey
WHERE { ?sub prop:hasManager ?conflictKey }

The conflict query may be a query that includes a union of more than one selection criteria involving resources of a data triple to be modified by the data manipulation operation. In this case, the conflict query may return more than one conflict key for a modified data triple and the conflict query would not return a result only when none of the criteria on the resources of the data triple is met. The following example generates conflict keys that also restrict concurrent manipulation of the projects that the employee works on using the SPARQL-UNION clause.

ON INSERT or DELETE OF { ?sub ?prop ?obj }
SELECT ?conflictKey
WHERE { ?sub prop:hasManager ?conflictKey }
    UNION
      { ?sub prop:worksOnProject ?conflictKey }

The standard SPARQL syntax may be used to conditionally generate some conflict keys based on some criteria that the resources from the modified triples satisfy. For example, if the same RDF graph stores information about the Employees as well as the Projects owned by the organization, the criteria for the conflict keys may vary based on the type of resource that is modified. The following conflict query may be used to restrict two transactions from manipulating multiple projects owned by the same department or information about employees having a common manager. The WHERE clause in the conflict query may also include SPARQL-FILTER clause so that the conflict keys are generated only when the FILTER clause is satisfied.

ON INSERT or DELETE OF { ?sub ?prop ?obj }
SELECT ?conflictKey
WHERE      {?sub rdf:type    acme:Project .
              ?sub prop:ownedByDept ?conflictKey }
    UNION
      { ?sub rdf:type    acme:Employee .
         ?sub prop:hasManager ?conflictKey }

The conflict query may specify an execution condition on a resource of a data triple to be modified by the data manipulation operation such that the conflict query is executed when the execution condition is met. The conflict queries may be defined to react to data manipulation on triples that match specific patterns by using specific RDF terms in the ON clause. For example, the following conflict query is applicable when the triples asserting the monetary value of some contracts are modified.

---
ON INSERT or DELETE OF { ?sub prop:hasContractValue ?obj }
SELECT ?conflictKey
WHERE {?sub prop:ownedByDept ?conflictKey }
---

Similarly specific values for subject and object variables may be specified to generate conflict keys only if the triples with matching RDF terms are modified.

The conflict query may select more than one resource of a data triple to be modified by the data manipulation operation as the conflict key. In some cases, the conflict key for a data manipulation operation is not an atomic value, but a concatenation of two or more values. This can be used to enforce finer units of conflict detection by stipulating that a transaction conflicts with another transaction only if they have a common concatenated conflict key. For example, an RDF graph may relax the conflict detection by allowing concurrent updates to a resource as long as the transactions do not modify the same subject-property combination. In this case, the conflict key is the concatenation of the subject and property values for the modified triples.

---
ON INSERT or DELETE OF { ?sub ?prop ?obj }
SELECT ?conflictKey1, ?conflictKey2
WHERE { ?conflictKey1 orardf:let ?sub .
        ?conflictKey2 orardf:let ?prop }
---

The above conflict query treats the concatenation of values bound into conflictKey1 and conflictKey2 as the effective conflict key for the data manipulation operation. This conflict query allows concurrent transactions to assert different properties with the same resource but prevents the same transactions from asserting the same property with a specific resource. The selection criteria specified for generating concatenated conflict keys may make use of the expressive power of SPARQL to identify individual conflict keys from the resources in the modified triple.

At 330 the query results are stored as conflict keys associated with the data manipulation operation and transaction. A transaction is said to be in conflict with another transaction if there is any overlap in their corresponding conflict keys. The conflict keys can be used to detect conflicts at the time of transaction merge (by configuring the transactions with optimistic locking) or they can used to avoid conflicts at the time of data manipulation operation (by configuring the transaction with pessimistic locking). Note that the graph query pattern that identifies conflict keys is executed prior to performing the data manipulation operation after substituting the relevant variables (sub in the above example) with the RDF terms from the modified triples.

While FIGS. 2-3 illustrate various actions occurring in serial, it is to be appreciated that various actions illustrated in FIGS. 2-3 could occur substantially in parallel. By way of illustration, a first process could receive a data manipulation operation, a second process could generate a conflict key, and a third process could store the conflict key with the data manipulation operation. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium stores computer executable instructions that if executed by a machine (e.g., processor) cause the machine to perform a method that includes receiving a data manipulation operation that modifies a triple in a database; selecting one or more triple component values as a conflict key to be associated with the data manipulation operation; and detecting a conflict between two or more data manipulation operations that have a same associated conflict key. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes, a first field for data associated with a long transaction identifier, a second field for data associated with a data manipulation identifier, and a third field for data associated with a conflict key. While three fields are described, it is to be appreciated that a greater and/or lesser number of fields could be employed.

Figure 4:
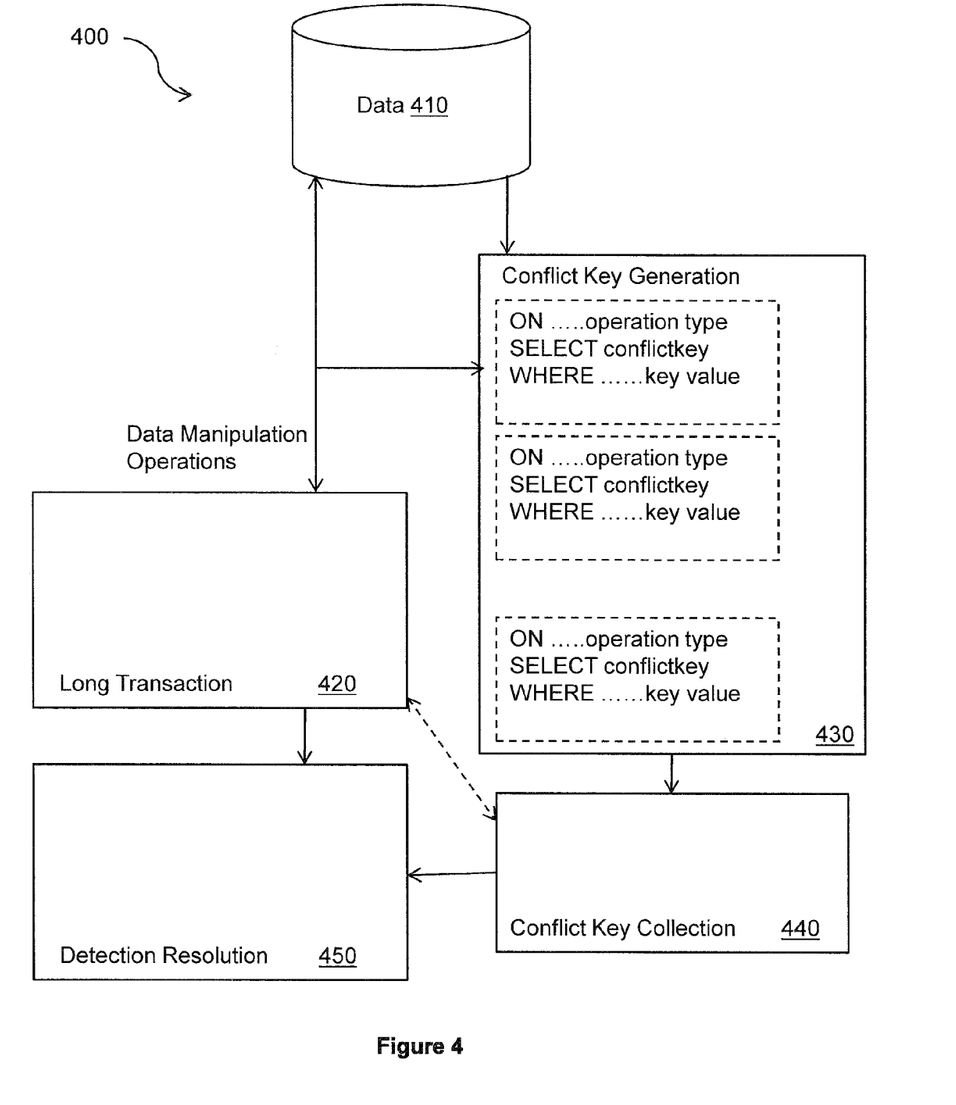
FIG. 4 illustrates an embodiment of system associated with logical conflict detection.

FIG. 4 is one embodiment of a functional block diagram of a long transaction processing system 400 that generates conflict keys for a long transaction 420 acting on live data 410. A conflict key generation logic 430 is configured to execute one or more conflict queries that specify conflict rules. The conflict queries are triggered by the long transaction performing specific types of data manipulation operations, as specified in the ON clause of the conflict query. The WHERE clause of the query assigns a value to the conflict key and may also specify selection criteria for the conflict key. Thus, in one example, the conflict queries are defined as declarative statements that are associated with a version-enabled RDF graph or storage unit. For each data manipulation operation executed within the context of a long transaction, one or more conflict queries may be activated, resulting in the generation of zero of more conflict keys.

The conflict keys are stored in a conflict key collection logic 440 that stores the conflict key as well as an identifier for the long transaction and the data manipulation operation with which the key is to be associated. In one example, the conflict keys are recorded in a metadata table along with the identifier for the modified triple and the transaction that modified it. A transaction generating the same conflict key for multiple data manipulation operations may be collapsed into one record.

The conflict keys are provided to a detection resolution logic 450 that compares conflict keys associated with different long transactions and detects a conflict when two transactions have a same conflict key associated with them. The transaction-specific conflict keys can be used to either detect conflicts at the time of transaction merge or restrict conflicts from happening at the time of data manipulation operation. When the transaction is configured for pessimistic locking, the conflict key for each data manipulation operation is checked against the metadata table and the current operation is allowed only if the same conflict key is not found to be generated by some other transaction. When the transaction is configured for optimistic locking, conflict detection is deferred until the merge of a transaction and any attempt to merge a transaction with its parent, compares its conflict keys with that of the parent and the transaction is allowed to merge only if there are no common conflict keys. Note that if one transaction merged before the other, the parent transaction inherits the conflict keys from the merged transaction and this is used to compare against any transaction trying to merge with the parent or refresh from the parent.

When the data stored in relational tables is conceptually mapped to RDF data, the conflict queries expressed as SPARQL graph patterns (discussed above) can be converted to equivalent SQL queries and applied on relational tables to support logical conflict detection for relational data. Such queries can span multiple tables so that the unit of conflict detection is customized for each application. The use of declarative conflict queries to detect and avoid conflicts allows the versioning subsystem to use a unit of conflict detection that is not tied to the unit of versioning.

Figure 5:
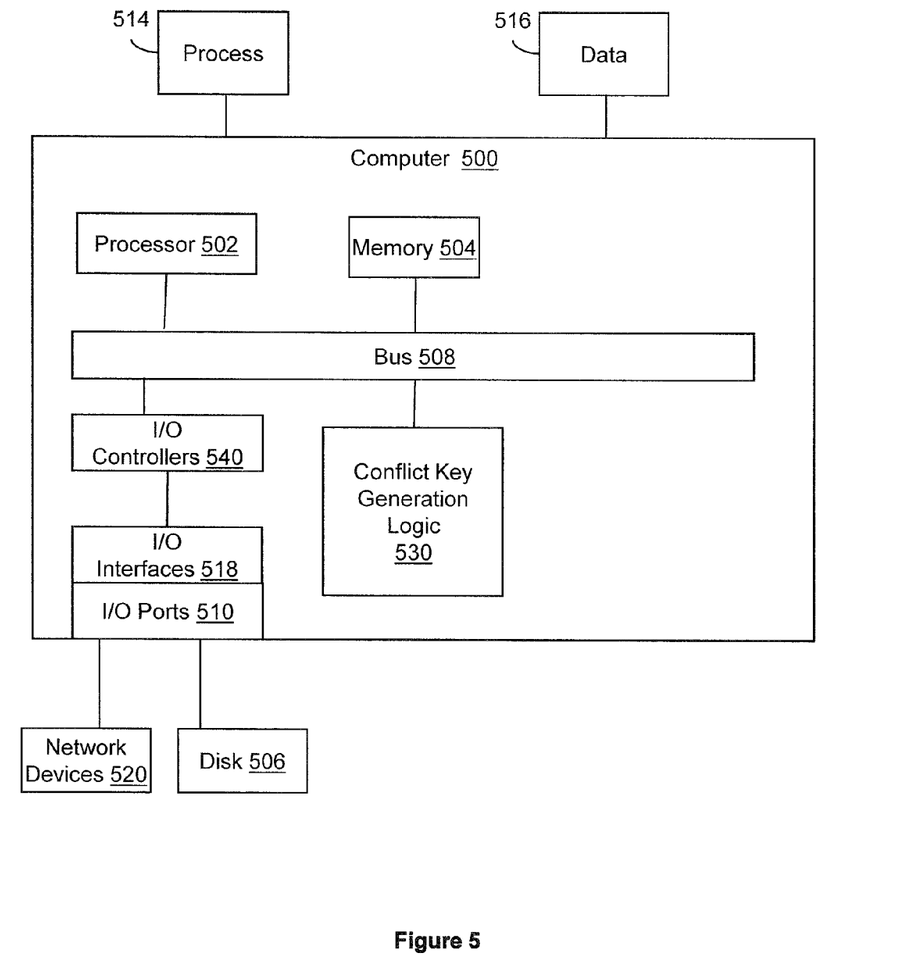
FIG. 5 illustrates an example embodiment of a computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a conflict key generation logic 530 configured to facilitate generating conflict keys for data manipulation operations. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for receiving a data manipulation operation that modifies data in a database, means for executing a conflict query on the data to be modified by the data manipulation; and means for storing the results of the conflict query as a conflict key that it is associated with the data manipulation operation.

The means may be implemented, for example, as an ASIC programmed to generate conflict keys. The means may also be implemented as computer executable instructions that are presented to computer 500 as data 516 that are temporarily stored in memory 504 and then executed by processor 502.

Logic 530 may also provide means (e.g., hardware, software, firmware) for detecting conflicts using conflict keys.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
    receiving a first transaction that includes a data manipulation operation that modifies data in a database;
    executing, by at least a processor, a conflict query on the data to be modified by the first transaction;
    storing, in a computer-readable medium, the results of the conflict query as one or more conflict keys that are associated with the first transaction;
    receiving a second transaction that includes a data manipulation operation that modifies data in a database;
    executing, by at least a processor, the conflict query on the data to be modified by the second transaction;
    storing, in a computer-readable medium, the results of the conflict query as one or more conflict keys that are associated with the second transaction;
    comparing the one or more conflict keys associated with the first transaction with one or more conflict keys associated with the second transaction; and
    detecting a potential logical conflict with respect to the first and second transactions when at least one conflict key associated with the first transaction matches at least one conflict key associated with the second transaction.

2. The computer-implemented method of claim 1 where the database stores data according to a relational data model and further where the one or more conflict keys are different than a primary key of a relational database record to be modified by the data manipulation operation.

3. The computer-implemented method of claim 1 where the database stores data according to an RDF data model and further where the conflict query selects a subject of a data triple to be modified by the data manipulation operation and where the selected subject is stored as one of the one or more conflict keys.

4. The computer-implemented method of claim 1 where the database stores data according to an RDF data model and further where the conflict query selects a property of a data triple to be modified by the data manipulation operation and where the selected property is stored as one of the one or more conflict keys.

5. The computer-implemented method of claim 1 where the conflict query specifies a selection criterion on the data to be modified by the data manipulation operation such that the conflict query does not return a result when the selection criterion is not met.

6. The computer-implemented method of claim 1 where the conflict query comprises a query that specifies an execution condition on the data to be modified by the data manipulation operation such that the step of executing the conflict query is performed when the execution condition is met.

7. The computer-implemented method of claim 1 where the conflict query comprises a union of more than one selection criteria on the data to be modified by the data manipulation operation such that each selection criteria is evaluated and one or more conflict keys are generated for each selection criteria that is met.

8. The computer-implemented method of claim 1 where the database stores data according to an RDF data model and further where the conflict query selects more than one resource of a data triple to be modified by the data manipulation operation and further where a concatenation of the selected resources is stored as the conflict key.

9. A computing system, comprising:
a processor;
conflict key generation logic configured to cause processor to execute a conflict query on data modified by a first transaction to generate one or more conflict keys for the first transaction;
the conflict key generation logic further configured to execute the conflict query on data modified by a second transaction to generate one or more conflict keys for the second transaction;
conflict key collection logic configured to associate the conflict key generated for the first transaction with the first transaction and to associate the conflict key generated for the second transaction with the second transaction; and
conflict detection resolution logic configured to compare the conflict keys associated with the first transaction to the conflict keys associated with the second transaction and to detect a potential conflict between the first and second transactions when at least one conflict key for the first transaction matches a conflict key for the second transaction, the conflict detection resolution logic further configured to prevent one or both of the first and second transactions from being performed if a potential conflict is detected.

10. The computing system of claim 9 where the conflict keys are stored in a metadata table along with an identifier for a triple modified by the transaction.

11. The computing system of claim 9 where the conflict key generation logic is implemented to generate conflict keys for a plurality of long transactions that concurrently perform data manipulation operations on an associated copy of data from a live data store.

12. The computing system of claim 9 where the conflict key generation logic generates a conflict key for a data manipulation operation on a relational data record that is different from a primary key for the record.

13. The computing system of claim 9 where the conflict key generation logic generates more than one conflict key for a data manipulation operation.

14. Non-transitory computer-readable medium having computer-executable instructions stored thereon for performing a method, the method comprising:
receiving a first transaction that includes a data manipulation operation that modifies data in a database;
executing a conflict query on the data to be modified by the first transaction;
storing the results of the conflict query as one or more conflict keys that are associated with the first transaction;
receiving a second transaction that includes a data manipulation operation that modifies data in a database;
executing the conflict query on the data to be modified by the second transaction;
storing the results of the conflict query as one or more conflict keys that are associated with the second transaction;
comparing the one or more conflict keys associated with the first transaction with one or more conflict keys associated with the second transaction; and
detecting a potential logical conflict with respect to the first and second transactions when at least one conflict key associated with the first transaction matches at least one conflict key associated with the second transaction.

15. The non-transitory computer-readable medium of claim 14 where the database stores data according to a relational data model and further where the one or more conflict keys are different than a primary key of a relational database record to be modified by the data manipulation operation.

16. The non-transitory computer-readable medium of claim 14 where the database stores data according to an RDF data model and further where the conflict query selects a subject of a data triple to be modified by the data manipulation operation and where the selected subject is stored as one of the one or more conflict keys.

17. The non-transitory computer-readable medium of claim 14 where the database stores data according to an RDF data model and further where the conflict query selects a property of a data triple to be modified by the data manipulation operation and where the selected property is stored as one of the one or more conflict keys.

18. The non-transitory computer-readable medium of claim 14 where the conflict query specifies a selection criterion on the data to be modified by the data manipulation operation such that the conflict query does not return a result when the selection criterion is not met.

19. The non-transitory computer-readable medium of claim 14 where the conflict query comprises a query that specifies an execution condition on the data to be modified by the data manipulation operation such that the step of executing the conflict query is performed when the execution condition is met.

20. The non-transitory computer-readable medium of claim 14 where the conflict query comprises a union of more than one selection criteria on the data to be modified by the data manipulation operation such that each selection criteria is evaluated and one or more conflict keys are generated for each selection criteria that is met.

21. The non-transitory computer-readable medium of claim 14 where the database stores data according to an RDF data model and further where the conflict query selects more than one resource of a data triple to be modified by the data manipulation operation and further where a concatenation of the selected resources is stored as the conflict key.

* * * * *

UNITED STATES PATENT AND TRADEMARK OFFICE
CERTIFICATE OF CORRECTION

PATENT NO. : 8,204,865 B2
APPLICATION NO. : 12/547570
DATED : June 19, 2012
INVENTOR(S) : Yalamanchi Page 1 of 1

It is certified that error appears in the above-identified patent and that said Letters Patent is hereby corrected as shown below:

In column 3, line 62, delete ""^"" and insert -- ^^ --, therefor.

Signed and Sealed this
Fourth Day of September, 2012

David J. Kappos
*Director of the United States Patent and Trademark Office*